United States Patent

[11] 3,615,465

[72] Inventor Hans B. Bullinger
Peabody, Mass.
[21] Appl. No 833,049
[22] Filed June 13, 1969
[45] Patented Oct. 26, 1971
[73] Assignee The United States of America as represented by the Administrator of the National Aeronautics and Space Administration

[54] PHOTOETCHING OF METAL-OXIDE LAYERS
5 Claims, 6 Drawing Figs.

[52] U.S. Cl. .......... 96/36.2, 156/3
[51] Int. Cl. .......... G03c 5/00
[50] Field of Search .......... 96/36.2, 156/3

[56] References Cited
UNITED STATES PATENTS

| | | | |
|---|---|---|---|
| 3,455,751 | 7/1969 | Frantzen .......... | 156/3 |
| 3,489,624 | 1/1970 | Lake et al. .......... | 96/36.2 X |
| 3,508,982 | 4/1970 | Shearin .......... | 96/36.2 X |

Primary Examiner—David Klein
Attorneys—John R. Manning, L. D. Woffard, Jr and J. H. Beumer

ABSTRACT: Techniques for the selective removal of conductive coatings from nonconductive base materials are disclosed. The invention contemplates the use of conventional photofabrication techniques to expose precisely defined regions of a coating, typically a metal-oxide, which are to be removed followed by the application of a metallic element and water and an acid. After the metal-oxide coating, the slurry of the metallic element and water and the acid are brought in contact with each other, a reaction occurs whereby the metal-oxide coating is reduced to elemental metal. The reaction is allowed to continue for a short time only whereby the elemental metal is but superficially attacked and is followed by an acid wash to remove the exposed elemental metal coating.

INVENTOR
HANS B. BULLINGER
BY
ATTORNEYS

PHOTOETCHING OF METAL-OXIDE LAYERS

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

1. Field of the Invention

The present invention relates to the selective removal of conductive coatings. More specifically, this invention is directed to improved photofabrication techniques which enable the etching of highly defined patterns in extremely thin metal-oxide coatings supported on nonconductive bases. Accordingly, the general objects of the present invention are to provide novel and improved methods of such character. 2. Description of the Prior Art In recent years, and particularly as a result of the growth of the semiconductor industry, photofabrication techniques have become highly refined and sophisticated. Briefly, the standard photoetching technique, as employed to expose the surface of an underlying material through the selective removal of a coating, contemplates the application of a coating of a photosensitive resist material. Thereafter, the resist material is baked and exposed through a mask so as to cause polymerization of the exposed areas. The resulting coating is developed and dyed and a suitable etchant is thereafter employed to selectively remove the exposed portions of the underlying material.

However, even though the art of photoetching has been highly developed, it has previously been very difficult to selectively etch very thin conductive coatings, especially transparent metal-oxide coatings, while achieving the desired highly detailed pattern definition. Metal oxide coatings, for example tin oxide on glass, have attracted considerable attention in view of their possible utility in display devices, particularly in display devices of the electroluminescent type. However, as a result of the etchability of most metallic oxides and further as a result of the thinness of the coatings employed where transparency is desired, the chemical etching of such coatings in a controllable manner has previously been very difficult. Attempts at photoetching of, for example, NESA glass have consistently resulted in overetching whereby the resultant etched pattern at best was characterized by very ragged edges.

Overetching that is undercutting of the polymerized photosensitive resist coating by the etchant, is a problem of long standing in the art. Previous attempts at solution of this problem have been largely concentrated on controlling the quality and quantity of the materials employed and determining when etching should be terminated. These approaches, unfortunately, are of little value in solving the problems discussed above with respect to the etching of transparent metal-oxide coatings.

SUMMARY OF THE INVENTION

The present invention over Xcomes the above-discussed and other disadvantages of the prior art and, in so doing, provides novel techniques for the selective removal of conductive coatings, particularly metal-oxide coatings, by chemical means. In accomplishing the foregoing, the present invention contemplates the employment of an initial reaction which will reduce the metal-oxide to elemental metal. Further in accordance with the present invention, the initial reaction is terminated in a very short time whereby the elemental metal is only superficially attacked. After the initial reaction has been terminated, as may be accomplished by a water wash, the exposed regions of coating which now comprises elemental metal may be chemically removed employing an acid wash.

BRIEF DESCRIPTION OF THE DRAWING

The present invention may be better understood and its numerous objects and advantages will become more apparent to those skilled in the art by reference to the accompanying drawing wherein like reference numerals refer to like elements in the several figures, and in which.

DESCRIPTION OF THE PREFERRED EMBODIMENT

Figures 1, 2, 3A, 3B, 3C, 3D:
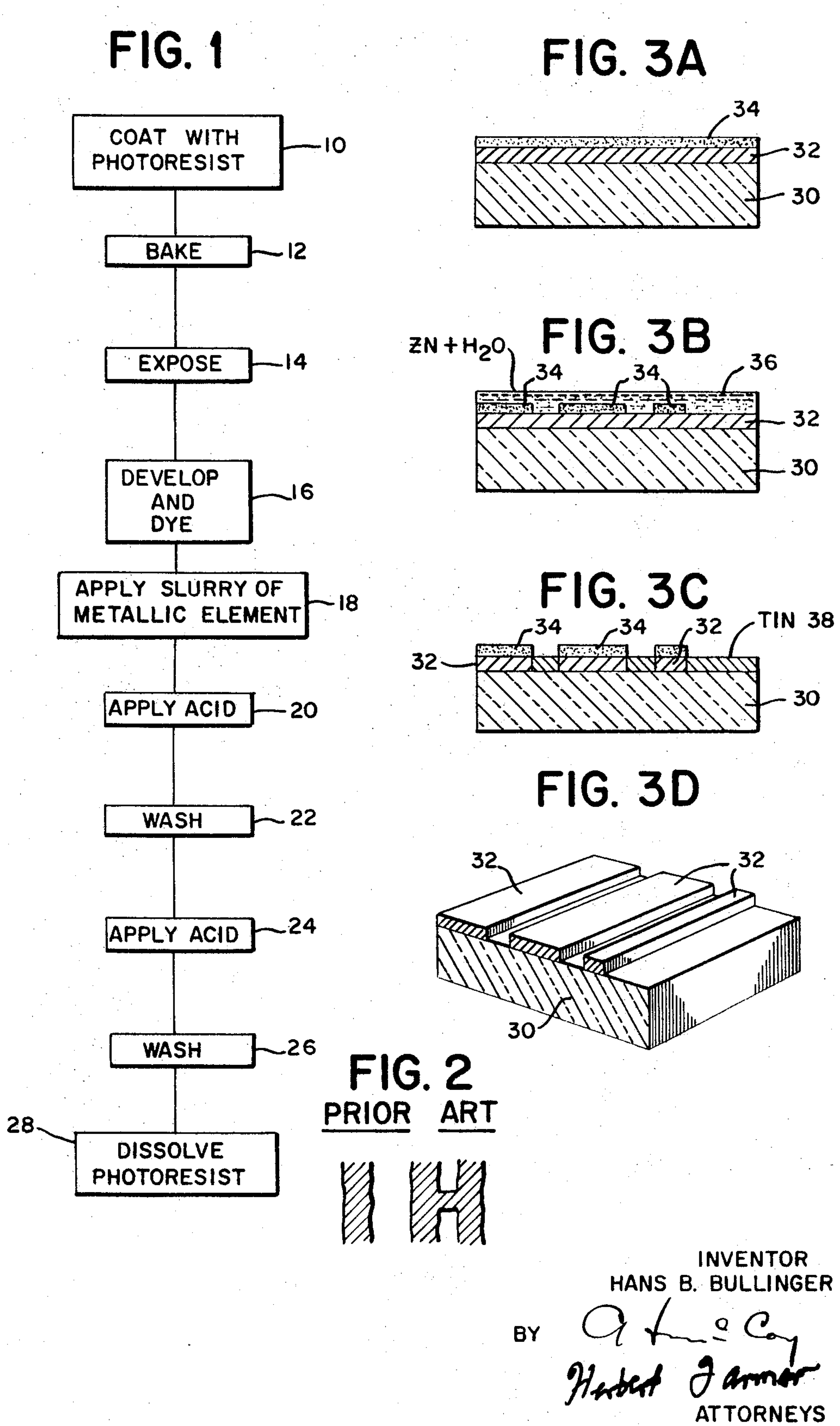
FIG. 1, FIG. 2 PRIOR ART, FIG. 3A, FIG. 3B, FIG. 3C, FIG. 3D
FIG. 1 is a flow diagram depicting the various steps employed in practicing the preferred embodiment of the present invention.
FIG. 2 comprises a top view of a metal-oxide coated substrate which has been etched by prior art techniques.
FIGS. 3A, 3B, 3C and 3D depict, in cross section, the results of various steps in accordance with the present invention, FIG. 3D being an isometric view representing the end product achieved through use of the present invention.

In the preparation of electronic circuit geometries in the microelectronics field or in the preparation of more or less intricate conductive patterns of metal-oxide coatings, for example for use in various electroluminescent or thermochromic devices, photosensitive resists are employed, both in the prior art and in accordance with the present invention. Briefly, photosensitive resist etching techniques contemplate the making of an enlarged scale drawing of the pattern to be etched. Next, the drawings are photographically reduced to a desired size. Simultaneously, the objects to be etched, which typically will comprise a thin coating formed or deposited on a substrate, are coated with a photosensitive etch resistant material as indicated by step 10 in FIG. 1. This etch resistant material may be a photosensitive polymerizable material, such as polyvinylalcohol, or a commercially available product sold under the name of Kodak Photo Resist by Eastman Kodak Company and believed to be a resinous ester of maleic anhydride and alkoxy hydroxy acetophenone. In FIG. 3A a substrate 30, which would typically be glass, and a metal-oxide coating 32 are shown. The thickness of the metal-oxide coating 32 is exaggerated and this coating would typically be sufficiently thin so as to be transparent. Typical conductive materials which may be deposited in sufficiently thin layers so as to be transparent in nature are tin-oxide, indium-oxide and cadmium-oxide. For purposes of explanation, application of the present invention to a tin-oxide coating on a glass substrate, such as the product known commercially as NESA glass and obtainable from the Corning Glass Works, will be discussed below.

Considering again the standard photofabrication techniques, a photosensitive resist coating 34 which covers the entire substrate is exposed to an intense light or to an ultraviolet source through the negatives of the photographically reduced drawings as indicated at step 14 in FIG. 1. Exposure to light causes the photosensitive material 34 to polymerize. After polymerization, the multilayer substrate is developed by rinsing with a solvent, such as Kodak Photo Resist Developer sold by Eastman Kodak Company as indicated at step 16 in FIG. 1. The developing process results in the exposure of the surface of the coating 32 in highly defined areas. The developed image forms a tough mask which is not affected by subsequently applied etchants. It is usually considered desirable to combine the developing and dyeing steps whereby the photoprocessed image is dyed thereby permitting visual checking of the accuracy of any pattern before proceeding further.

Up to this point, the techniques followed in the practice of the present invention are commensurate with those in the prior art. For further information on prior art photofabrication techniques, reference may be had to the publication, P-79, entitled "An Introduction to Photofabrication Using Kodak Photosensitive Resists" published in 1966 by the Eastman Kodak Company, Rochester New York. In accordance with the prior art, after the developing step, the exposed areas of the material to be etched are subjected to the corrosive action of an acid or alkali, the overall effect being the complete dissolution of the material in the exposed areas. During the etching step, extreme care must be exercised to avoid overetching (wherein the resist coating would be undercut) and also to avoid underetching (whereby distortions in the pattern would result). Where conductive materials are being selectively etched by a photofabrication technique, underetching would often result in an electrical continuity where discontinuity was desired and/or a decrease in resistance from that which is desired. As noted above, prior attempts to control the etching step have concentrated on reducing the thickness of the resist to a minimum, optimizing exposure time and exercise of extreme care in selection and application of the etchant. It is, of course, well known that etching time is critical, particularly due to the inevitable variations in thickness of the resist and due to other inhomogeneities introduced, for example, by nonuniform distribution of temperature on baking and cooling of the resist, defects in the resist itself, and the like. However, even with optimization of all process parameters, it has nevertheless been previously very difficult to obtain predictable sharpness of an etched image in transparent conductive coatings, particularly when very small detail is encountered.

In view of the aforementioned problems, the present invention departs from the prior art after the develop and dye step 16 and achieves etching in a novel two-step process. Continuing to consider the example wherein a transparent tin-oxide coating on a glass substrate is to be selectively etched, after development step 16, a water slurry of a metallic element is applied in a layer 36 as illustrated in FIG. 3B. In depositing the slurry 36, indicated as step 18 in FIG. 1, a metallic element which will react with hydrochloric acid and the tin-oxide is selected. Thus, in the example being described, the layer 36 preferably comprises a zinc powder-water slurry. Alternatively, the zinc can be deposited in powder form and thereafter wetted with water.

Application of the zinc slurry is followed, as indicated at step 20, by the application of an acid such as hydrochloric acid. In one example, a five percent hydrochloric acid solution was applied and excellent results obtained. Upon the contact of the zinc dust and hydrochloric acid, the following reaction may occur:

$$Zn+2HCl=ZnCl_2+2\ H$$

The atomic hydrogen (hydrogen in statu nascendi) while only momentarily formed, is nevertheless highly aggressive; and reacts immediately with the tin-oxide to produce elemental tin and water.

As will be obvious to those skilled in the art, if the reaction is allowed to continue, the tin oxide layer will be completely dissolved as a result of the continued reduction of tin-oxide to tin and the reaction of the hydrochloric acid with the tin as follows:

$$Sn+2HCl=SnCl_2+H_2$$

The molecular hydrogen is released during the process. It is to be noted, however, that the exact chemical reactions taking place have not as yet been precisely ascertained.

In accordance with the present invention, the quantities of zinc powder and hydrochloric acid that are employed and the amount of time the reaction is allowed to continue are controlled so that the tin-oxide layer is reduced to metallic tin but the metallic tin is only superficially attacked.

Thus, a principal feature of the present invention resides in the fact that the attacking of the metallic tin is permitted to continue but very briefly since the reduction of the tin-oxide to metallic tin is an almost instantaneous process. Accordingly, as indicated in step 22 of FIG. 1, the remaining zinc and hydrochloric acid are washed off with water in a procedure which may be considered to be almost simultaneous. That is, the application of the zinc slurry followed by the application of the hydrochloric acid and finally the water wash are ordinarily steps which follow one another without any substantial delay. Termination of etching in this manner results in the structure shown in cross section in FIG. 3C, where the polymerized portions of the photoresist 34 and the elemental tin 38 are shown.

The next step in accordance with the present invention comprises the application of an etchant as indicated in step 24. Where the material to be removed comprises tin, the etchant would be, for example, hydrochloric acid. The etchant is typically applied in very small quantities and usually in stepwise fashion so that the tin will be dissolved in localized areas only in accordance with the following reaction:

$$Sn+2HCl=SnCl_2+H_2$$

In a successful small scale operation, the acid wash was accomplished by dipping a cotton swab into the hydrochloric acid and swabbing the tin. After dissolving the tin, the excess hydrochloric acid is washed off using, for example, tap water.

The remaining resist material is then dissolved with a suitable solvent (e.g. acetone) in step 28 to produce the structure shown in FIG. 3D. In FIG. 3D, which is an isometric view, strips of the tin oxide coating have been removed, after reduction to elemental tin, to produce a highly defined pattern. Conversely, typical results employing prior art techniques may be seen in the top view of the tin-oxide coated glass substrate shown in FIG. 2. FIG. 2 clearly indicates the irregularities caused by overetching wherein the resist has been undercut. FIG. 2 also shows a bridge connecting two oxide strips such as could result from underetching.

While a preferred embodiment has been shown and described, various modifications and substitutions may be made thereto without departing from the spirit and scope of the present invention. Accordingly, it is to be understood that the present invention has been described by way of illustration and not limitation.

What is claimed is:

1. In a process for selectively removing portions of a tin-oxide coating from a glass substrate which comprises applying a layer of a photosensitive resist material over at least a portion of said tin oxide coating, exposing said photosensitive material to light in areas commensurate with areas of the tin oxide coating to be retained, removing the unexposed portions of the photosensitive material to thereby expose highly defined regions of the tin oxide coating and contacting the resulting exposed portions of said tin oxide coating with elemental zinc and hydrochloric acid whereby said exposed tin oxide is removed, the improvement which comprises first contacting said resulting exposed portions of said tin oxide coating with finely divided zinc, water and a hydrochloric acid solution for a period of time sufficient to convert said tin oxide to elemental tin without substantially removing the resulting tin layer, terminating the reaction effected thereby, and then chemically removing said resulting tin layer.

2. The process of claim 1 wherein said resulting tin layer is removed by contacting the same with an aqueous hydrochloric acid solution.

3. The process of claim 2 wherein said reaction of said tin oxide with said zinc and hydrochloric acid is terminated by application of a water wash to the resulting tin layer.

4. The process of claim 3 wherein the step of chemically removing said resulting tin layer comprises applying an aqueous hydrochloric acid solution stepwise at one area of the surface of said layer at a time.

5. The process of claim 4 wherein said exposed portions of said tin oxide coating are contacted with zinc, water and hydrochloric acid by application of an aqueous slurry of zinc powder, followed by application of an aqueous hydrochloric acid solution.